(12) United States Patent
Radivojevic et al.

(10) Patent No.: US 6,345,354 B1
(45) Date of Patent: Feb. 5, 2002

(54) REGISTER FILE ACCESS

(75) Inventors: Ivan Radivojevic, San Francisco; Inder Bhasin, Menlo Park; Per Forssell, Fremont, all of CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 09/302,246

(22) Filed: Apr. 29, 1999

(51) Int. Cl.[7] .......................... G06F 9/30; G06F 9/305; G06F 1/06
(52) U.S. Cl. .................... 712/213; 712/220; 714/34; 711/125; 711/123; 713/322; 713/502
(58) Field of Search .................. 714/15, 34; 377/49, 377/28; 713/322, 502; 365/189.12, 205, 233.5, 230.6, 230.3; 711/138, 214, 119, 123, 125; 712/213, 210, 208, 220, 228, 211, 209, 212; 710/53; 345/429

(56) References Cited

U.S. PATENT DOCUMENTS

| | | | | |
|---|---|---|---|---|
| 5,394,450 A | * | 2/1995 | Pasternak | 377/49 |
| 5,398,330 A | * | 3/1995 | Jonhson | 714/15 |
| 5,544,342 A | * | 8/1996 | Dean | 711/119 |
| 5,623,700 A | * | 4/1997 | Parks et al. | 710/53 |
| 5,710,578 A | | 1/1998 | Beauregard et al. | 345/429 |

* cited by examiner

Primary Examiner—Daniel H. Pan
(74) Attorney, Agent, or Firm—Townsend and Townsend and Crew LLP

(57) ABSTRACT

A method, apparatus, and manufacture to facilitate power-efficient register file access for preparing a register file to be accessed. Efficient operation of a processor is facilitated while still conserving power. Register information can be decoded during the first phase of a clock to make a determination as to which register within a register file should be accessed. Furthermore, a determination can be made using logic modules as to whether the register information will actually be required by an execution unit during a second phase of the clock. Upon a determination that the register should be enabled, the register is enabled to allow the contents of the register to be output. In this fashion, power can be conserved when it is determined that the information stored by a register file is not required. Such a determination might be made, for example, when it is learned that the information in the register should be bypassed as invalid or an exception occurs cancelling the instruction.

23 Claims, 9 Drawing Sheets

REGISTER FILE ACCESS

BACKGROUND OF THE INVENTION

This invention relates generally to the field of microprocessors. More particularly, it relates to the area of accessing a register file within a microprocessor.

In the area of microprocessors, power is typically an important concern. This is especially true in devices that operate in a standalone manner, such as in many consumer devices. Such is the case because these devices must often operate from small power supplies. As the number of features incorporated into a chip increases, it can become even more important to conserve power whenever possible. Other benefits to be gained by reducing the power required by a processor include reducing the size and weight of a power supply as well as reducing the heat generated by the processor.

An area that often conflicts with power consumption in the field of microprocessors is the efficient or fast operation of the processor. The ability to operate the processor in a fast manner often leads to greater performance of the processor. Hence, it is usually desirable to operate a processor at its greatest speed possible. One technique to generate fast operation is the speculative enablement of the output of a register. This type of operation allows the register information to be ready when it might be required by an execution unit in the processor. However, it will not always be required. For example, in the case where speculative instructions are issued, a register associated with the instruction is also speculatively enabled such that a read access of the register file can occur. Thus, when the instruction is not required, power has been wasted in enabling the output lines of the register. (A speculative instruction might be cancelled, for example, when it is learned that a branch misprediction occurred.) Similarly, register information in the past has been unnecessary when operand information is bypassed due to its invalid status. In some processors this could happen in perhaps 50% of all instructions. This is due to the fact that compilers sequence program steps such that common operands are used by successive instructions. Therefore, operand information at an execution unit is sometimes more accurate than the operand information in the register—hence a bypass of the register is issued and the operand at the execution unit is used in place of the operand stored in the register. Once again allowing a register file access to occur in such a situation is wasteful. Nevertheless, such enablement has been used in the past when attempting to run the processor at a fast rate. Hence, in the past there has been a tradeoff between speed and power consumption for microprocessors.

As the foregoing illustrates, there is a need for a microprocessor that permits relatively fast operation (such as through speculative operations) while conserving power. More particularly, there is a need for a manner of accessing a register within a register file that facilitates fast operation while also conserving power.

SUMMARY OF THE INVENTION

The present invention provides a method, apparatus, and article of manufacture that facilitate conservation of power while allowing for fast system (e.g., microprocessor) operation.

One embodiment of the invention provides a method and apparatus in which a register file access in a microprocessor can be enhanced. The invention provides a register which is adapted to store information, provides a clock signal that defines a first phase and a second phase, decodes register information during the first phase that specifies the register in which the information is stored, and enables at least one register bit line of the register during the second phase of the clock signal.

In other embodiments of the invention bypass control logic and/or instruction dispatch control logic control whether the output from the register should be enabled.

These and other embodiments of the invention can be implemented in a variety of formats. This could include at least an actual integrated circuit, a core for insertion within an application specific integrated circuit (ASIC), as well as computer code that can wholly or partly describe (for such purposes as modeling or semiconductor manufacturing), the apparatus and/or method.

In accordance with the present invention, speculative instructions may be issued and the benefits from such instructions derived while reducing or eliminating the consequence of wasted power on an unnecessarily enabled register (such as, for example, when the register information is bypassed, a dispatch stall occurs, or some other reason removes the need for the register information).

Other and further advantages and features of the invention will be apparent to those skilled in the art from a consideration of this description taken in conjunction with the accompanying drawings, wherein certain methods of practicing the invention are illustrated. However, it is to be understood that the invention is not limited to the details disclosed herein but includes all such variations and modifications as fall within the spirit of the invention and the scope of the appended claims.

DESCRIPTION OF THE SPECIFIC EMBODIMENTS

Figure 1:
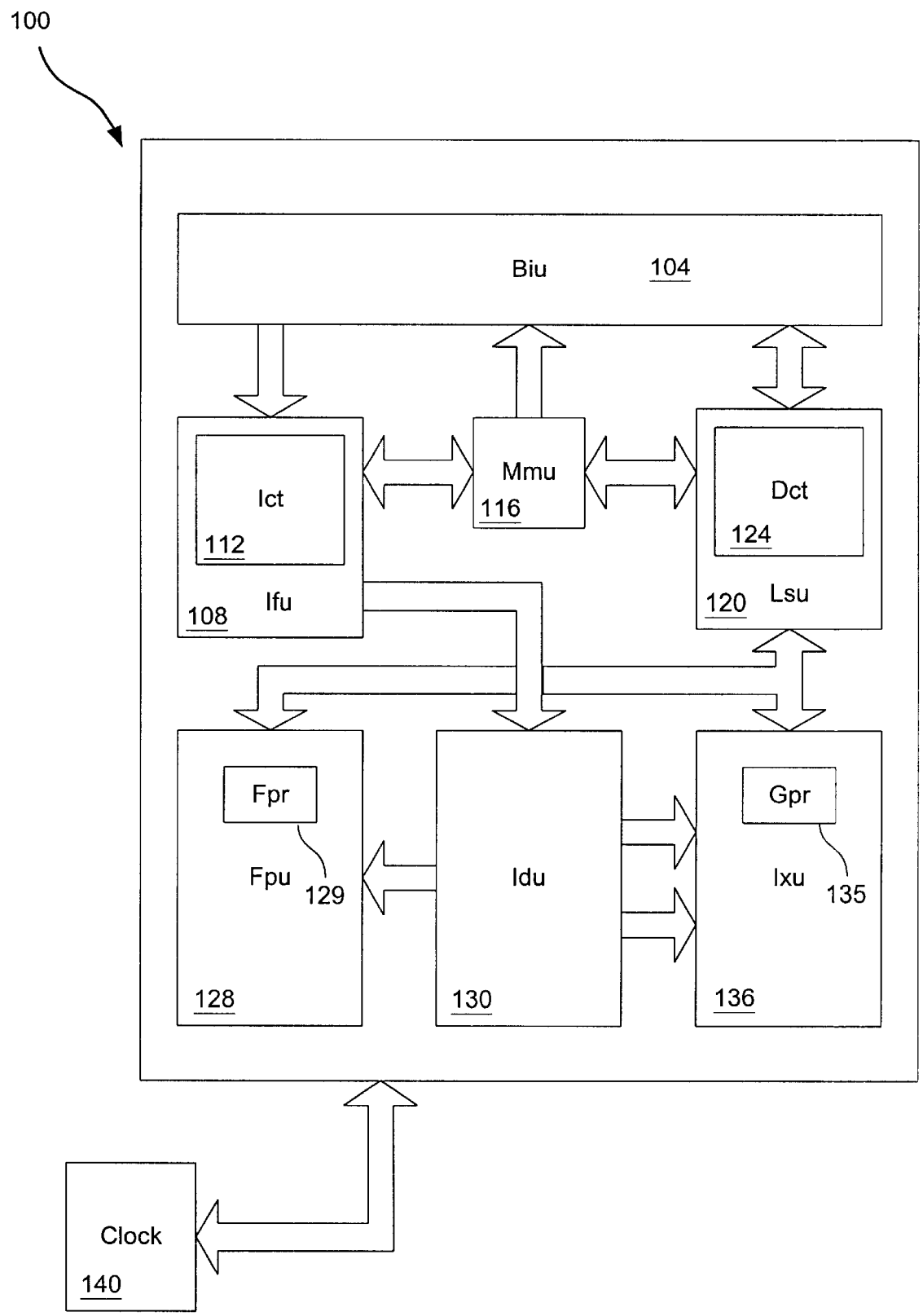
FIG. 1 shows a block diagram of one embodiment of a microprocessor that incorporates one embodiment of the present invention.

Referring now to the drawings, and more particularly to FIG. 1, there is shown a functional block diagram of a microprocessor 100 which incorporates one embodiment of the present invention. The microprocessor shown in FIG. 1 includes a bus interface unit (Biu) 104 and instruction fetch unit (Ifu)108, a memory management unit (Mmu) 116, a load/store unit (Lsu) 120, a floating point execution unit (Fpu) 128, an instruction dispatch unit (Idu) 130, an integer execution unit (Ixu) 136, and clock circuitry 140.

In accordance with conventional microprocessor design, bus interface unit 104 is utilized to couple signals to and from other units in microprocessor 100 to a bus (not shown). Additionally, instruction fetch unit 108 provides a stream of instructions to instruction dispatch unit 130. The instruction dispatch unit controls execution devices such as integer execution pipelines or floating point execution pipelines disposed in units 136 and 128, respectively. The memory management unit handles address translation for the instruction fetch unit and the load/store unit. The load/store unit handles instructions related to memory transactions and data cache management related to memory transactions. The floating point unit executes floating point instructions, such as IEEE single and double precision data formats; while, the integer execution unit executes integer instructions. More than one floating point execution unit or integer execution unit can be utilized, depending on the preference of a designer.

Instruction fetch unit 108 includes an instruction cache (Ict) 112. Similarly, the load/store unit 120 includes a data cache (Dct). The floating point unit 128 and integer execution unit 136 include floating point register file (Fpr) 129 and general purpose register file (Gpr) 135, respectively. In a preferred embodiment, each register file contains 32 entries (i.e., "registers") and each entry (register) is 64 bits wide. The clock 140 includes conventional clock circuitry as one of ordinary skill in the art would easily understand. Such a clock preferably generates a single clock signal generating a square wave. Alternatively, clock 140 may generate overlapping clock signals such that a two-phased signal is presented to microprocessor 100. Circuitry involving phase-locked loop technology can be utilized for the clock as well.

Figure 2:
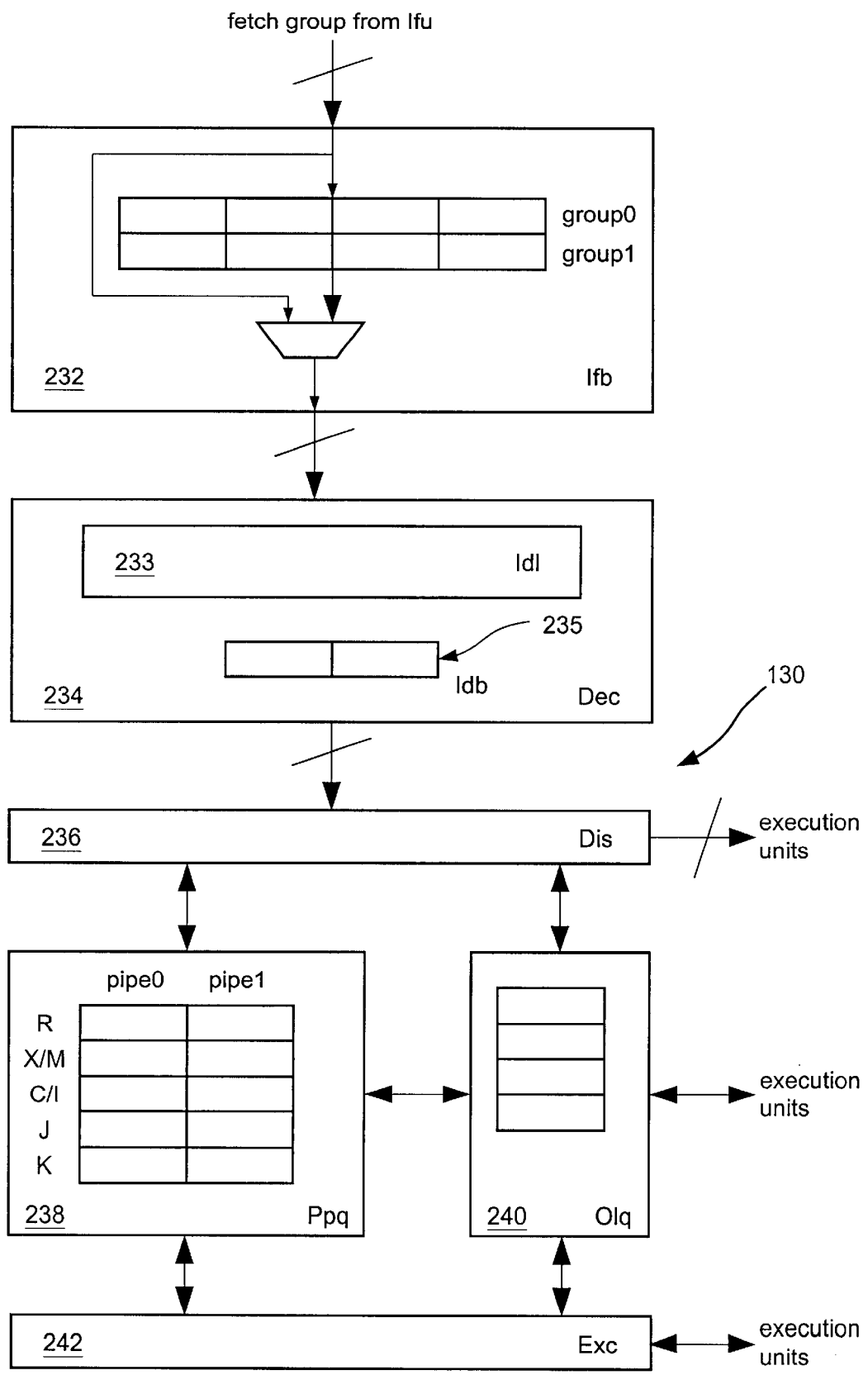
FIG. 2 shows one embodiment of an instruction dispatch unit in accordance with the present invention.

FIG. 2 shows one embodiment of instruction dispatch unit 130 which can be utilized in accordance with one embodiment of the invention. In FIG. 2, a group of instructions, e.g., an instruction fetch group from instruction fetch unit 108, are fed to an instruction fetch buffer (Ifb) 232. For example, two groups of four instructions are stored in the instruction fetch buffer. An instruction decode section (Dec) 234 is coupled to the instruction fetch buffer such that instruction decode logic (Idl) 233 decodes instructions and stores them in the instruction decode buffer (Idb) 235. Selected instructions are dispatched by the instruction dispatch section (Dis) 236 to the various execution units. In the preferred embodiment, two integer execution units, and one floating point execution unit are utilized. A pipe queue (Ppq) 238 is coupled to the instruction dispatch section 236 as well as to an exception handling section 242. Ppq 238 stores information on active instructions that are being executed in the instruction pipeline. An outstanding load queue (Olq) 240 is coupled to the pipe queue as well as to the instruction dispatch section 236 and exception handling section 242. Olq 240 stores information on outstanding load transactions and is utilized in operand dependency checking and bypass control. The exception handling section and the outstanding load queue are coupled to the execution units as well.

Figure 3:
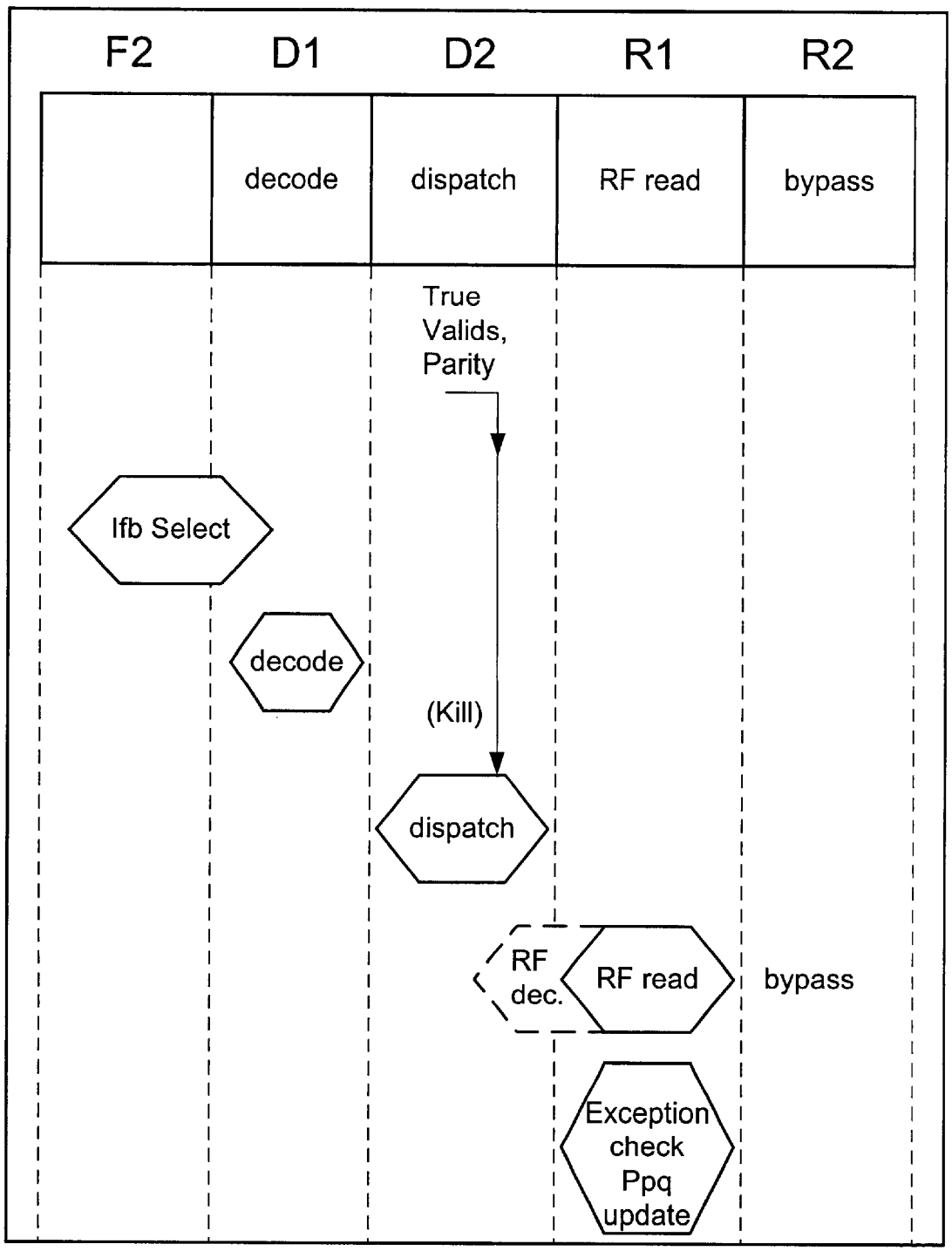
FIG. 3 shows a pipeline timing diagram for the instruction dispatch unit of FIG. 2.

FIG. 3 shows a high level description of the operation of instruction dispatch unit 130. More specifically, FIG. 3 provides a partial instruction timing diagram in which various stages of an instruction pipeline of unit 180 are illustrated. For example, F2 refers to the second phase of the instruction fetch stage; D1 and D2 correspond to the instruction decode and instruction dispatch phases, respectively, of the D stage; and R1 and R2 refer to the first and second phases, respectively, of the register file read stage. The relationships of these stages to various portions of the instruction dispatch unit are described below.

Figure 5:
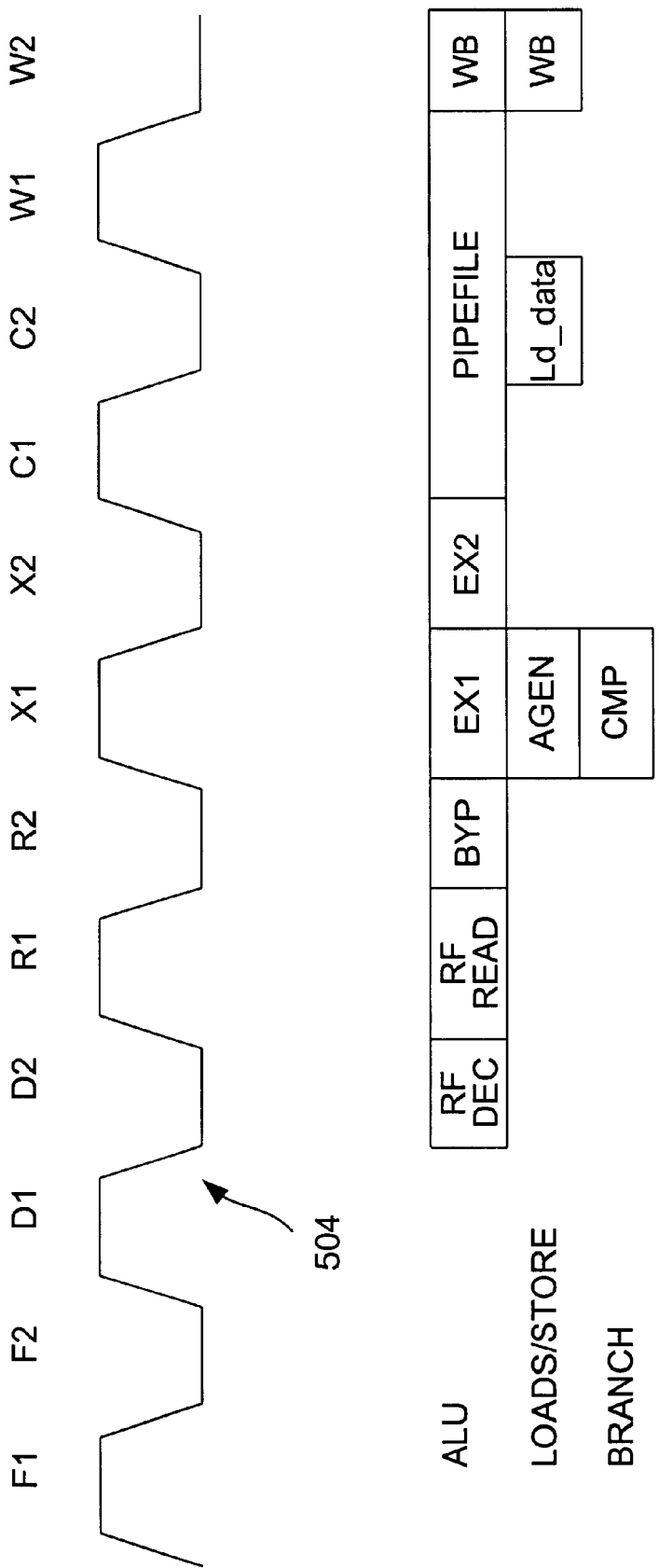
FIG. 5 shows a timing diagram for instructions executed by one embodiment of the invention.

The relationship of the pipeline stages of FIG. 3 to the overall pipeline of microprocessor 100 (which is a 6 stage pipeline) is illustrated in FIG. 5. Clock signal 504, generated by clock 140 (FIG. 1), is broken down by its successive phases into the various stages of an instruction cycle of microprocessor 100. This instruction cycle is broken down to 6 stages where: F1 and F2 correspond to instruction fetch; D1 and D2 correspond to instruction decode; R1 and R2 correspond to register file read; X1 and X2 correspond to execute; C1 and C2 correspond to data cache read; and W1 and W2 correspond to a write-back. Further background on multi-stage instruction cycles in general is provided in *Computer Organization and Design, The Hardware/Software Interface* by David A. Patterson and John L. Hennessy, second edition, Morgan, Kaufman Publishers, Inc.; *Computer Architecture: A Quantitative Approach*, second edition, by John L. Hennessy and David A. Patterson, Morgan, Kaufman Publishers; *MIPS RISC Architecture* by Gerry Kane and Joe Heinrich, Prentice-Hall, Inc., 1992; and *See MIPS Run*, by Dominic Sweetman, Morgan Kaufmann Publishers, Inc., 1999, all of which are hereby incorporated by reference in their entirety for all purposes.

Referring again to FIGS. 1–3, a timing diagram for a portion of a typical instruction cycle for one embodiment of the invention and associated hardware are shown. Instruction fetch buffer 232 selects an instruction that is to be dispatched to an execution unit, such as floating point execution unit 128 or integer execution unit 136 in stage F2. The instruction is decoded in decode section 234 during phase D1. Next, the instruction is dispatched by dispatch section 236 during stage D2. If a signal is received from an outside source indicating that that particular instruction should be killed (i.e., that the instruction is no longer valid) the dispatch during phase D2 is halted.

During the D2 stage, the instruction which is being dispatched can physically designate an operand that is to be used with the instruction. (For purposes of this invention, it should be understood that the word "operand" is intended to include the information with which an instruction is to operate, such as data values, variables, addresses, etc.) This operand can correspond with a register entry in the register file of an execution unit. For example, the operand might correspond with information stored in a general purpose register of Gpr 135 or within a floating point register in Fpr 129. Operand dependency checking (which can halt the dispatch of a given instruction) is also performed during the D2 stage.

The read of the register file is delayed until the register file read stage (R1 stage). This allows a determination to be made as to the validity of the entries within the register file (i.e., whether the register file entry is up to date, or whether the operand should be forwarded from one of the pipefiles or from one of the execution units), before the actual register file is read. In this way, valid operands are read from the register files.

When the information stored in a register is invalid, the pipefile serves as a source of valid information in some cases. Different operations take different amount of cycles to complete execution (e.g., integer addition is a single-cycle operation, while an integer load instruction takes 2 cycles to compute an address and access the data cache). Thus, instructions often complete execution out-of-order. To make sure the CPU architectural state is updated in program order, a number of staging pipeline latches are implemented at the output of individual execution units. These latches are referred to as "pipefile." Hence, these valid results can be used in place of the invalid information stored by a register.

As can be seen in FIG. 3, the register designation information can be decoded during D2 (e.g., "RF dec." in FIG. 3) such that the register which will be required can be designated. For example, if an operand is designated in a specific register of the general purpose register file of the integer execution unit (i.e., Gpr 135), the binary representation of this operand in the instruction (i.e., in the form of a register identity) is decoded by a simple logic block, such that a signal can be transmitted to enable the output of this specific register within a Gpr 135. For example, a five bit binary number allows designation of 32 registers in an execution unit through use of 5 to 32 decoder logic.

Idu 130 dispatches instructions to Ixu 136 and Fpu 128 during the first half of the R stage, (i.e., R1). Idu 130 forwards instruction opcodes and instruction immediate value fields to Ixu 136 and Fpu 128 and directs Ixu 136 and Fpu 128 to complete the reads of the register files Gpr 135 and Fpr 129, respectively. Idu 130 then writes the dispatched instruction into the pipe queue (Ppq) 238. The operands are forwarded from one of the register files, from one of the corresponding pipe files, or from an execution unit as result operands (i.e., operand information in an execution unit that is more up-to-date than corresponding information for the operand stored in a register) when a bypass operation takes place or as load data from the Lsu 120.

In stage R1, a read of the register file takes place. According to one embodiment of the invention, this is activated when one confirms that an instruction dispatch takes place and/or when one confirms that the information stored within a register of the register file will not be bypassed. If none of these criteria are met, then power is saved by not enabling a register file access to occur. Rather, this embodiment of the invention conserves power by ensuring that at least one of the criteria is met, thereby indicating that the information in the register is more likely to be utilized.

A bypass of a register file might take place when operand information is being computed in an immediately prior instruction. This will typically occur due to the fact that some compiler designs are implemented so that instructions which require common operands are implemented in succession. This successive use of operands speeds the operation of a microprocessor in that it facilitates transferring the results of an instruction more quickly from one execution unit to another execution unit, rather than transferring the results of a first instruction back to the register file and then transferring that operand from the register file to an execution unit for use by the succeeding instruction. This can save several phases of the clock cycle and can reduce the delay in waiting for an operand to be written back to a register file. Therefore, in keeping with this type of compiler design, one embodiment of the invention allows a bypass signal to be generated indicating that the information in the register file is not required because it can, for example, be transferred from the execution unit more quickly than it can be accessed from the register file. This bypass signal can be to a bypass logic control module 412 which inhibits an output of the register file or specific register by, for example, not enabling a register file access if the information stored within the register is bypassed. Therefore, efficiency is maintained while reduced power operation is also achieved.

Bypass events occur in instances understood by those of ordinary skill in the art. For example, in D2, the operand register number is used to perform a look-up into Ppq 238 and Olq 240. If any "hit" is detected, the register will be bypassed in case the instruction actually gets dispatched. This "hit" signal is available by the end of the D2 phase and is utilized to signal that a bypass should occur. Ppq 238 is a 5×2 entry FIFO/CAM and serves as a repository of information about instructions being executed. For example, it keeps track of which instructions are older than other instructions, which instruction is finished executing, and importantly tracks the operand information for these instructions. Hence Idu 130 can initiate a table look up of Ppq 238 to determine if the information in the execution units is more valid than that stored in a register. If that is the case, a "hit" signal is generated. Similarly, Olq 240 is a 4 entry CAM storing information on the outstanding load transactions. Loads that miss in the data cache (Dct) are moved from the Ppq to the Olq and stay there until the load value is returned by LSU 120 and written to the Gpr or Fpr. Again, Idu 130 can perform a table lookup of the Olq as well.

Furthermore, in one embodiment of the invention an exception causes the register file information to be unnecessary. The causes of exceptions in microprocessor architecture are understood by those of ordinary skill in the art. For example, an exception could be raised by an older instruction that results in an arithmetic overflow or results in a translation lookaside buffer (TLB) miss. Furthermore, an exception could be issued upon an external event (e.g., an external interrupt or reset). In such an embodiment the exception signals are processed in a similar fashion as the bypass signals to prevent a register file access from occurring and thereby conserving power.

In another embodiment, a cancelled instruction causes the register file information to be unnecessary. For example, in a pipeline architecture, where branch instructions are issued, a branch mispredict causes instructions younger than that branch instruction to be canceled. This causes the instruction fetch unit to restart instruction fetch from the alternate path address. As a result, speculatively dispatched instructions being executed in the pipeline will have been dispatched unnecessarily and will not be cancelled since they have already been dispatched. Therefore, power can be saved by not enabling a register file access to occur for these unnecessary instructions when a branch misprediction occurs. Again, in such an embodiment, the branch misprediction signal is processed in a similar fashion as the bypass signals to prevent the register from being enabled such that a register file access takes place—thereby conserving power.

Figure 4:
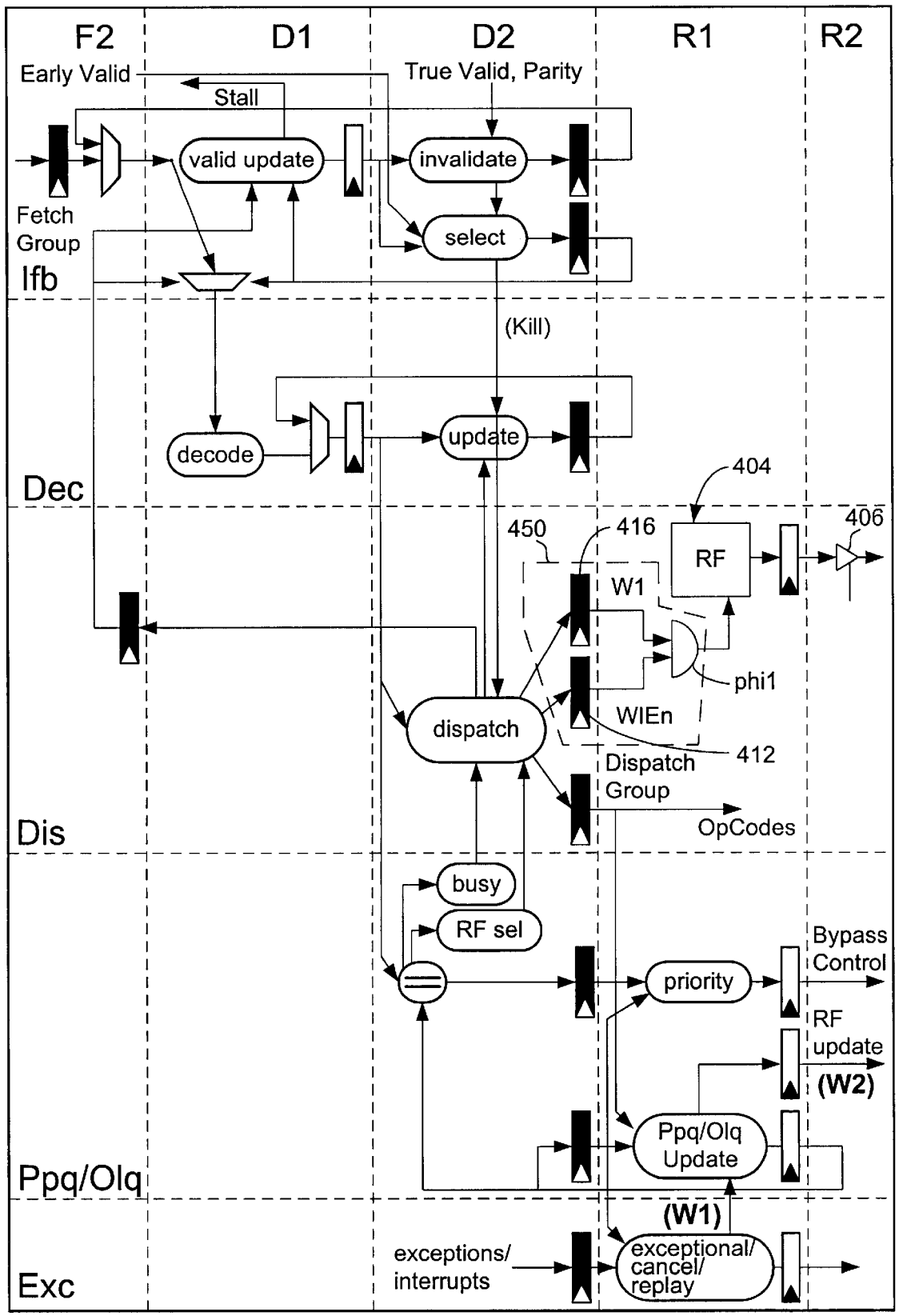
FIG. 4 shows a more detailed description of the pipeline diagram of FIG. 3.

FIG. 4 shows a more detailed description of the pipeline timing diagram of FIG. 3. Essentially, one embodiment of the invention permits a user to speculatively issue instructions that can designate a register while conserving power. In this fashion, a register can essentially be predicted as well. However, a register file access is not enabled immediately so as to prevent power from being wasted. This can be accomplished in several ways. For example, one might withhold power supplied to a particular register within the register file or even withhold power supplied to the register file. For example, one might want to withhold power from the output bit lines of the register file or from sense amplifiers following the register file. Preferably, however, this is accomplished by not enabling a read access of the register or register file. In accordance with FIG. 4, this process is accomplished by dispatching in stage D2 for a first time period the register file information so as to determine using conventional decoding logic whether a register file is required. This is indicated by the latch and data line labeled WL (which stands for "word line"). A register might not be required when the information in the register is invalid. For example, if the operand stored by a register has recently been revised in an execution unit, then the value of the operand retained or existing in the register of the register file will likely no longer match the value in the execution unit. Therefore, it would be inappropriate to output the operand stored in the register file. Rather, one might want to transfer the operand information from the execution unit. In such a bypass situation, the WLEN line can indicate to the logic that the register storing the operand should not be enabled for an access of the register information. Alternatively, the latch and data line labeled WLEN can be utilized to show that an operand has not been bypassed. As the logic shows in phase R1, the WL signal and WLEN signal can be "ANDED" upon the occurrence of a Phi 1 signal, indicating the triggering of the R1 phase. The output of this logic can then be used to trigger or allow enablement of the register file 404 shown in FIG. 4 so that a register file access can occur. Consequently, the register-access-logic-unit 450 permits a register file to be read and the contents of a register to be output to an execution unit or other device which requires the information. In FIG. 4, a sense amplifier, driver, or alternative output device 406 is shown which is utilized to further drive the output from the register file.

Alternatively, independent logic could be utilized for each register rather than a common logic block for the entire register file (e.g., for Fpr129 and Gpr 135). Therefore, the logic associated with each register would determine whether enablement of the output lines of that register should occur.

The operation of the control logic of register-access-logic-unit 450 in phase D2 of FIG. 4 accomplishes several independent functions. For example, during D2 one confirms that an instruction was actually dispatched during phase D2. Preferably, this confirmation is made by: (1) determining that none of the instruction's operands is "busy" (i.e., still being computed somewhere in the processor), (2) determining that the necessary execution resources/units are available, and (3) determining that an instruction is not cancelled due to a misprediction or exception, as would be understood by a person of ordinary skill in the art. It is envisioned that subsets of these factors could be utilized as well to accomplish a power savings. This indicates that indeed the contents of the register referenced by an instruction will be needed by an execution unit and therefore the register should be enabled. In addition, register-access-logic-unit confirms that bypass control information derived about a given operand indicates that the corresponding instruction should be executed. This bypass control information determines whether the information stored in the register should or should not be bypassed. For example, the logic indicates whether the information that is being requested in the register is valid information. As mentioned earlier, the information may have been revised and not yet updated. This can occur, for example, when an instruction preceding the instruction in question results in a change to an operand which is stored in the register. In such an instance, the operand information would be forwarded from an execution unit rather than from the register file. Then, the register file would be updated in due course. The combinational logic and output lines WL and WLEN are utilized to determine during the second time period that a register file should be accessed.

The enablement of the register file in FIG. 4 occurs based on different events, happening together. FIG. 4 shows merely one example. In some embodiments, one may choose to power the register file whenever a logic controller 450 can confirm that the register information will not be bypassed and/or that the instruction has indeed been dispatched. Alternatively, one might utilize exception information (e.g., information about an external event occurring somewhere else in the processor) as the trigger for not permitting a register to be powered. Any of these aspects may occur together or individually and can be utilized to make the determination as to whether or not the register file should be powered.

Figure 7:
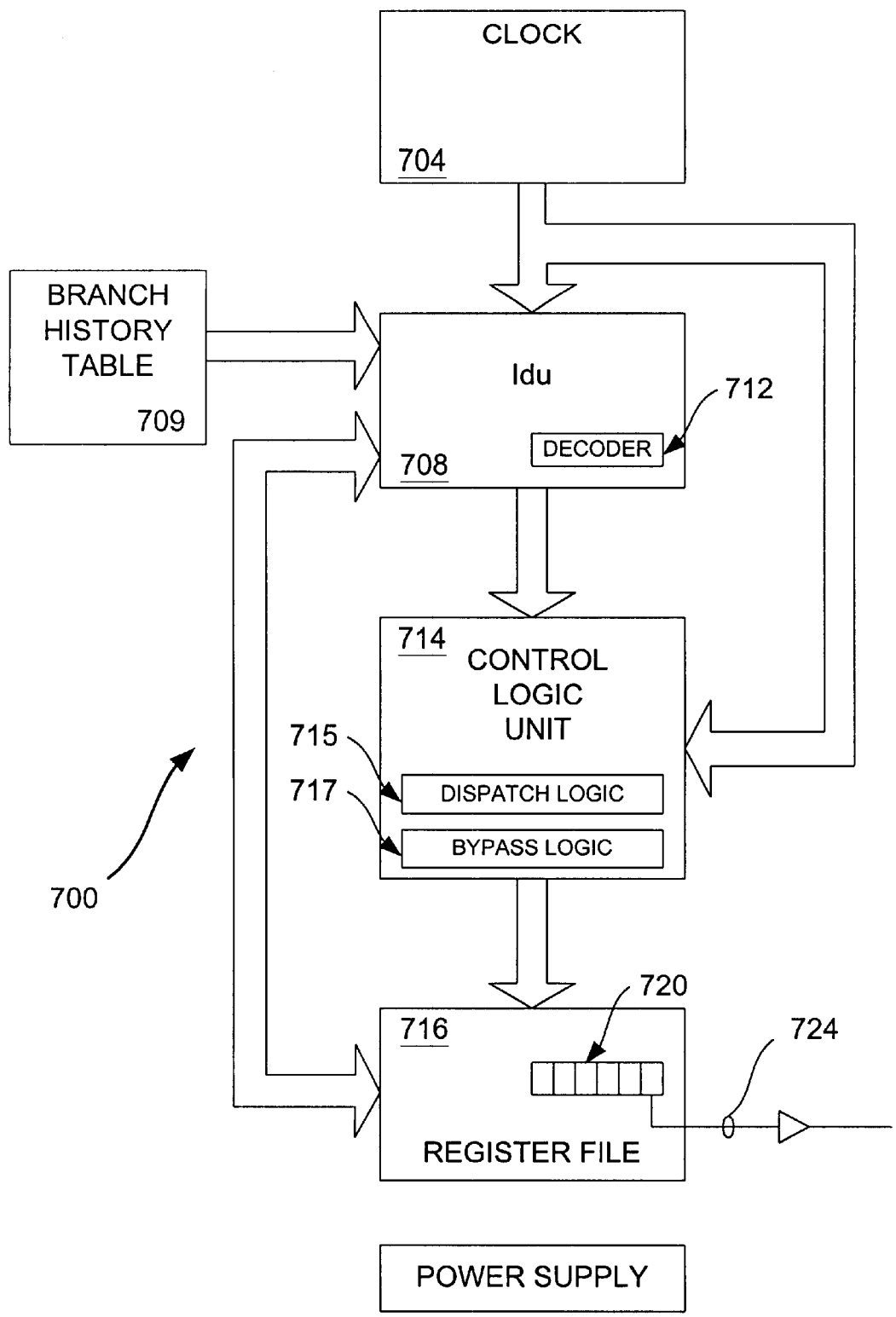
FIG. 7 shows another alternative embodiment of the invention.

Another embodiment of the invention can be seen in FIG. 7. In FIG. 7, a microprocessor 700, e.g., a reduced instruction set computer (RISC) microprocessor, can be seen in which a register file 716 includes at least one register 720 disposed within that register file. The registers within that register file are adapted to store binary information. In fact, these registers store information that represents operands that are utilized by instructions dispatched from the instruction dispatch unit 708. The microprocessor includes a floating point unit and integer execution unit or more than one of each of these execution units. Within each execution unit, a register file is preferably stored. For example, in the floating point unit, a floating point register is stored, while in an integer execution unit, a general purpose register is stored. In an alternative embodiment, the registers may be stored in locations other than execution units. FIG. 7 also shows clock circuitry 704, which provides a clock signal that establishes or defines a first phase and a second phase of the clock signal. A person of ordinary skill in the art would understand how such circuitry would operate; however, one embodiment utilizes a single periodic wave in which the first phase immediately precedes the second phase. In an alternative embodiment, overlapping multiple clock signals might be utilized to accomplish the clocking of the components of the circuit in FIG. 7. The first phase and second phase essentially define time periods for accessing the register as explained herein. The instruction dispatch unit 708 includes a decoder unit 712, which decodes information about a register that is to be selected during phase D2 (FIGS. 3 and 4). In addition, a branch history table 709 is utilized to predict the outcome of a branch instruction. The instruction dispatch unit is coupled to a control logic unit 714 which is comprised of a dispatch logic unit (715) which confirms that an instruction has been dispatched and a bypass logic unit (717) that confirms that no bypass of the register information will take place, as described above in reference to logic units 416 and 412 in FIG. 4. The register file 716 is comprised of a register 720 containing binary information. This binary information is output on a bit line 724, although typically a plurality of bit lines will be utilized. A power supply provides power to the processor.

Figure 6:
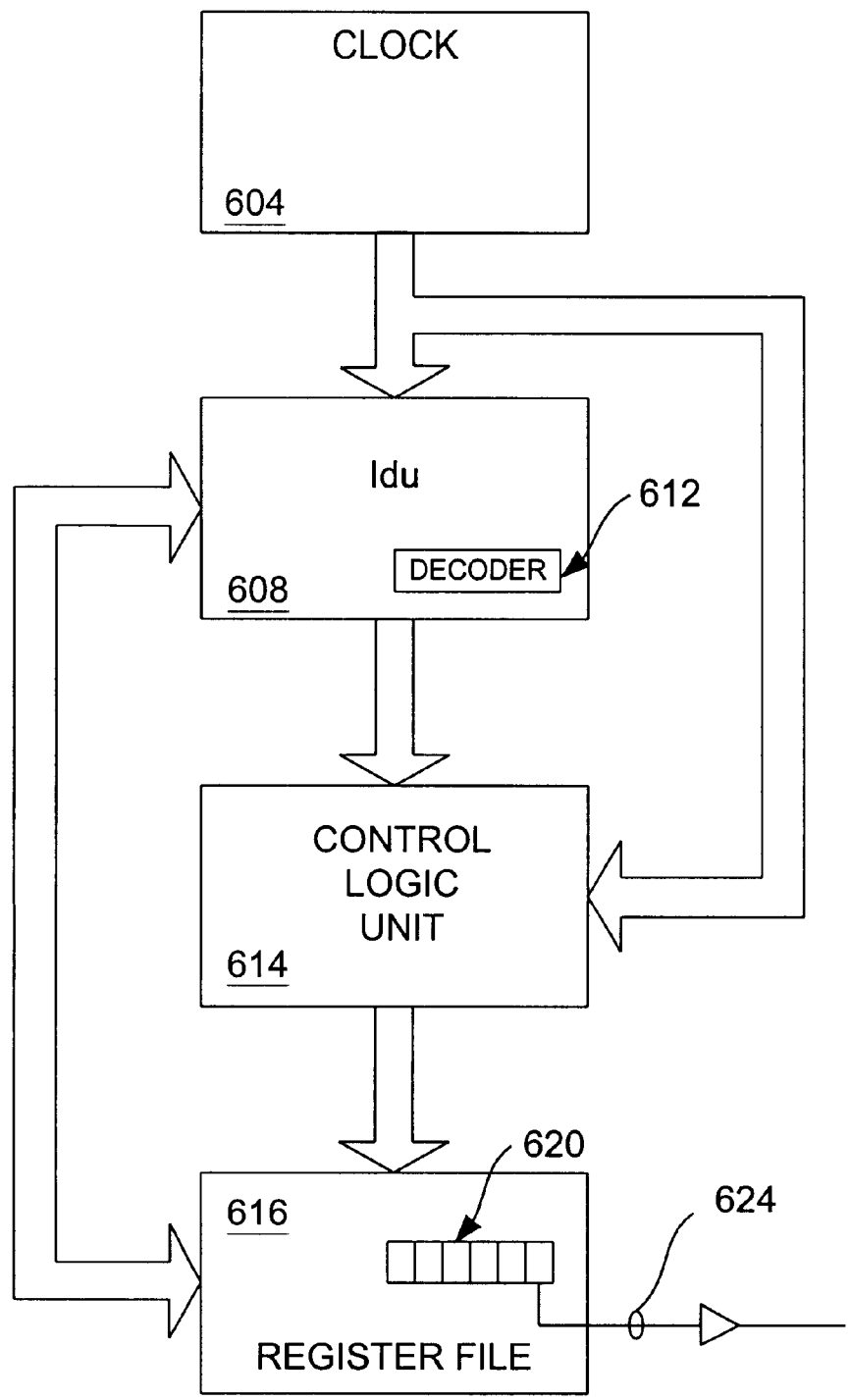
FIG. 6 shows one embodiment of the invention in which control logic can determine whether information in a register file should be output.

Another embodiment of the invention can be seen in FIG. 6 in which like numbers represent like components. FIG. 6 shows that a broader basic concepts can be accomplished from that shown in FIG. 7.

Figure 8A:
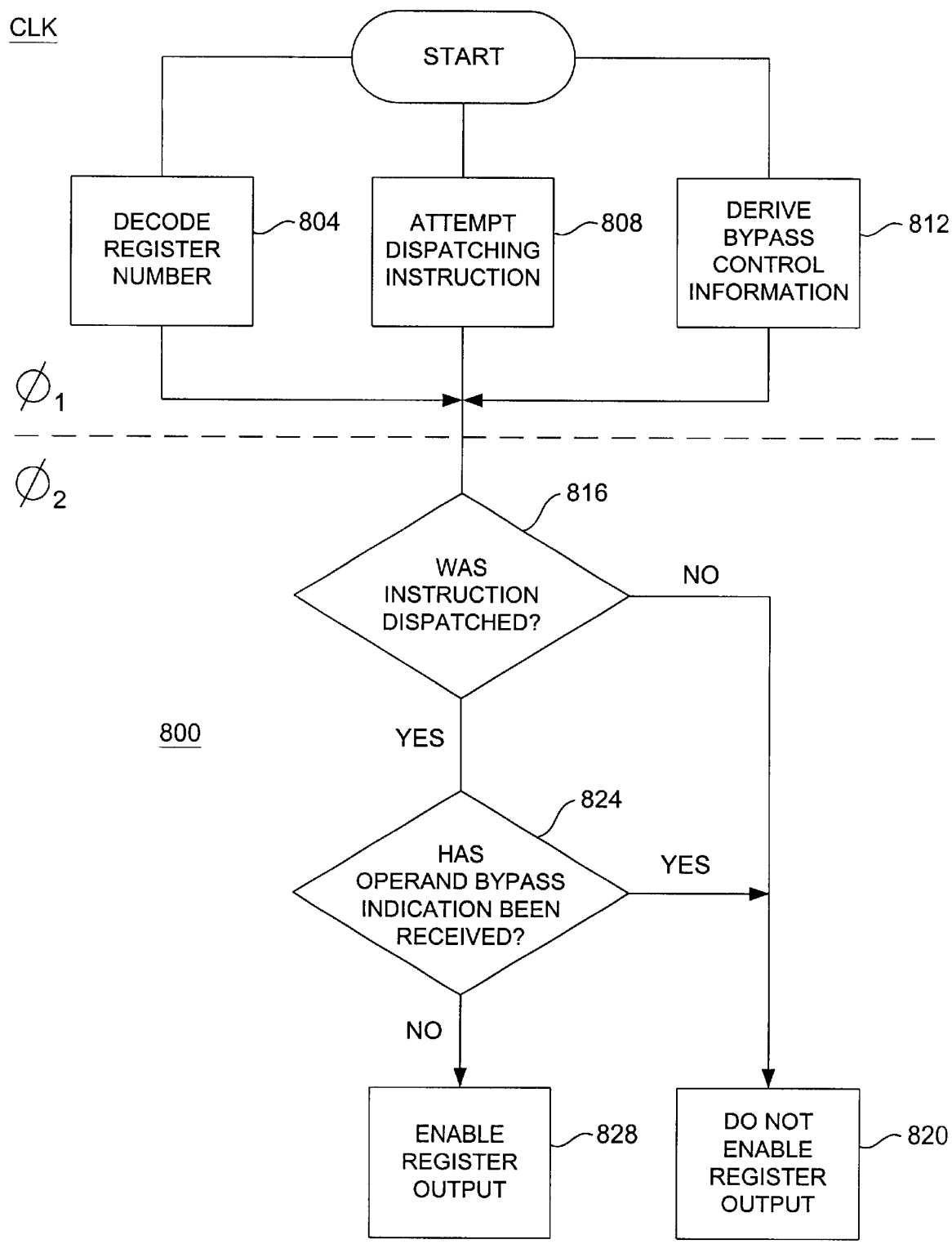
FIGS. 8a,b are a flow charts of a method for conserving power when performing a register file access in accordance with the present invention.
Figure 8B:
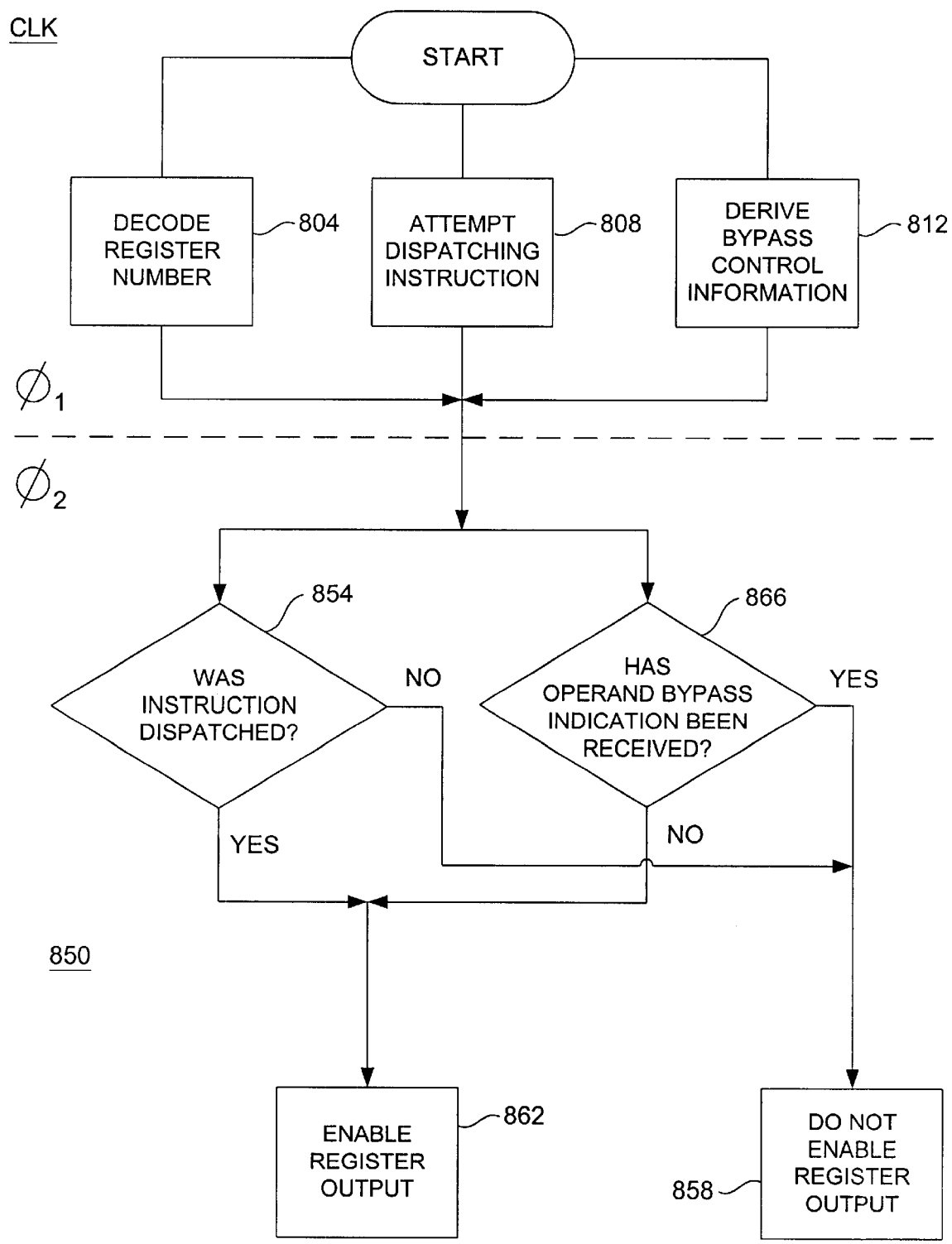

In FIGS. 8a and 8b, a method for practicing two of the embodiments of the invention can be seen. In FIG. 8a, a register number is decoded 804, an attempt to dispatch an instruction is made 808, and bypass control information is derived 812 prior to the second phase, e.g., in phase 1 of a clock cycle. Next, a determination is made as to whether the instruction was actually dispatched 816. If the instruction was not dispatched, then the register information will not be necessary. Therefore, the register file bitlines are not enabled 820 so that enabling of the register file bitlines is withheld to some degree and power is saved. Alternatively, if the instruction was dispatched, the bypass control information is tested to see if there is an indcation that the operand will be bypassed in phase 824.

If an indication has been received indicating that the operand will be bypassed, then the register file bitlines are not enabled 820 and power is conserved. Alternatively, if the operand is not bypassed, then the register file bitlines are enabled 828. In this manner, both a confirmation that the instruction was dispatched and a confirmation that the operand will not be bypassed must be made before the register is enabled for a register file access.

Alternatively, the occurrence of either a confirmation that an instruction was dispatched or a confirmation that the operand information has not been bypassed can be used to allow enablement of the register. In FIG. 8b, a flowchart for this method is shown. Once again, a register number is decoded 804, an attempt is made to dispatch an instruction 808, and bypass control information is derived 812 prior to the occurrence of phase 2 of the clock signal. Then, a determination is made as to whether the instruction was actually dispatched 854. If the instruction was not dispatched, then the register is disabled 858. If the instruction was dispatched, then the register is enabled 862. Alternatively, the bypass information can be used. A determination can be made as to whether the operand has been bypassed 866. If the operand has been bypassed, the register is disabled 858. If the operand has not been bypassed by the occurrence of clock signal phi 2, then the register is enabled 862. In this manner, either the instruction dispatch information or the operand bypass information is utilized to determine whether the register should be enabled to output the register information. It is not necessary that both be used.

One embodiment of the invention is particularly applicable for use in consumer devices. Consumer devices are considered to be devices that operate outside the realm of a traditional stand alone personal computer. For example, a consumer device might be a child's game, a laser printer, a video game, a network router, set top boxes, palmtop devices, handheld PCs, etc. These consumer devices are often stand alone devices, as in the case of a child's toy. Therefore, it is desirable to operate these devices on a small power supply. The present invention facilitates this by allowing the invention to be powered by a small power supply and small voltage supply. For example, it is envisioned that one embodiment of the invention is accomplished by utilizing a power supply between about 1.5 volts and about 1.8 volts. In addition, it is believed that the microprocessor 100 implemented with one embodiment of the present invention is accomplished with a power supply of about 2 watts, when operated in a semiconductor package, with an operating temperature of about 100° C. Furthermore, it is envisioned that this embodiment of the microprocessor can be disposed on a die size that is less than or equal to about 35 mm².

In addition to embodiments where the invention is accomplished by hardware, it is also noted that these embodiments can be accomplished through the use of an article of manufacture comprised of a computer usable medium having a computer readable program code embodied therein, which causes the enablement of the functions and/or fabrication of the hardware disclosed in this specification. For example, this might be accomplished through the use of hardware description language (HDL), register transfer language (RTL), VERILOG, VHDL, or similar programming tools, as one of ordinary skill in the art would understand. For example, the Verilog simulator "VCS v.4.1.1" by Synopsys, Inc. was used to simulate the invention. The book "A Verilog HDL Primer" by J. Bhasker, Star Galaxy Pr., 1997 provides greater detail on Verilog and HDL and is hereby incorporated by reference for all that it discloses for all purposes. It is therefore envisioned that the functions accomplished by the present invention as described above could be represented in a core which could be utilized in programming code and transformed to hardware as part of the production of integrated circuits. Therefore, it is desired that the embodiments expressed above also be considered protected by this patent in their program code means as well.

It is also noted that many of the structures and acts recited herein can be recited as means for performing a function or steps for performing a function, respectively. Therefore, it should be understood that such language is entitled to cover all such structures or acts disclosed within this specification and their equivalents, including the matter incorporated by reference.

It is thought that the apparatuses and methods of the embodiments of the present invention and many of its attendant advantages will be understood from this specification and it will be apparent that various changes may be made in the form, construction and arrangement of the parts thereof without departing from the spirit and scope of the invention or sacrificing all of its material advantages, the form herein before described being merely exemplary embodiments thereof.

What is claimed is:

1. A method of accessing a register file in a microprocessor, the method comprising:

providing a register adapted to store information;

providing a clock signal defining a first phase and a second phase;

decoding register file information during said first phase that specifies said register; and enabling at least one register bitline of said register during said second phase.

2. The method of claim 1 further comprising:

confirming during said first phase that an instruction was dispatched; and then enabling output on said at least one register bitline during said second phase in response to said confirming during said first phase that said instruction was dispatched.

3. The method of claim 1 further comprising:

determining that the information stored in said register has not been bypassed; and then enabling output on said at least one register bitline during said second phase in response to said determining that said information stored in said register has not been bypassed.

4. The method of claim 1 further comprising:

confirming during said first phase that an instruction was dispatched;

determining that said information stored in said register has not been bypassed; and then enabling output on said at least one register bitline during said second phase in response to said determining that said information stored in said register has not been bypassed and in response to said confirming during said first phase that said instruction was dispatched.

5. The method of claim 3, wherein said second phase immediately follows said first phase.

6. An apparatus comprising:

a register adapted to store information;

clock circuitry operable to provide a clock signal defining a first phase and a second phase;

an instruction decode unit configured to decode during said first phase register information that specifies said register; and a logic unit adapted to enable output on at least one register bitline of said register during said second phase of said clock signal so as to allow said instruction to utilize said information stored in said register.

7. An apparatus comprising:

a register adapted to store information;

clock circuitry operable to provide a clock signal defining a first phase and a second phase;

an instruction decode unit configured to decode during said first phase register information that specifies said register;

means for enabling output on at least one register bitline of said register during said second phase.

8. The apparatus of claim 7 further comprising:

means for confirming during said first phase that an instruction was dispatched.

9. The apparatus of claim 7 further comprising:

means for determining that the information stored in said register has not been bypassed.

10. The apparatus of claim 7 further comprising:

means for confirming during said first phase that an instruction was dispatched, and means for determining that the information stored in said register has not been bypassed.

11. A method of accessing a register file in a microprocessor, the method comprising:

providing a register for storing information;

defining a time period for accessing said register as comprising at least a first time period and a second time period;

decoding during said first time period that said register should be accessed while withholding at least some power to output data from said register; and determining during said second time period that said register should be accessed.

12. The method of 11 wherein said withholding at least some power to output said data from said register comprises withholding power from at least one bitline of said register.

13. The method of 11 and further comprising:

powering said register in response to said determining during said second time period that said register should be accessed.

14. A method comprising:

providing a register file adapted to store information, said register file comprising at least one register;

providing a clock signal defining a first phase and a second phase;

decoding a register signal during said first phase so as to determine at least one register of said register file; and enabling output on at least one register bitline of said register during said second phase.

15. An apparatus comprising:

a register file adapted to store information;

at least one register disposed within said register file;

clock circuitry operable to provide a clock signal defining a first phase and a second phase;

a decoder operable to decode a register signal during said first phase so as to determine at least one register of said register file; and a logic unit operable to enable output on at least one register bitline of said register during said second phase.

16. An article of manufacture, comprising:

a computer usable medium having a computer readable program code means embodied therein for causing enablement of at least one register bitline of a register, the computer readable program code means in said article of manufacture comprising:

computer readable program means for causing a computer to generate a register file adapted to store information;

computer readable program means for causing a computer to generate at least one register disposed within said register;

computer readable program means for causing a computer to generate clock circuitry operable to provide a clock signal defining a first phase and a second phase;

computer readable program means for causing a computer to generate a decoder operable to decode a register signal during said first phase so as to determine at least one register of said register file; and computer readable program means for causing a computer to generate a logic unit operable to enable output on at least one register bitline of said register during said second phase.

17. A method comprising:

providing a register adapted to store an operand;

providing a clock signal defining a first phase and a second phase;

dispatching an instruction that requires said register;

deriving bypass control information about said operand during said first phase; and enabling at least one register bitline of said register during said second phase in response to said deriving bypass control information about said operand.

18. An apparatus comprising:

a register adapted to store an operand;

clock circuitry operable to provide a clock signal defining a first phase and a second phase;

an instruction dispatch unit configured to dispatch an instruction that requires an operand stored by said register;

a bypass control unit configured to derive bypass control information about said operand during said first phase;

wherein said bypass control information determines whether at least one register bitline of said register should be enabled during said second phase.

19. An article of manufacture, comprising:

a computer usable medium having a computer readable program code means embodied therein for causing enablement of at least one register bitline of a register, the computer readable program code means in said article of manufacture comprising:

computer readable program means for causing a computer to generate at least one register adapted to store information;

computer readable program means for causing the computer to generate clock circuitry operable to provide a clock signal defining a first phase and a second phase;

computer readable program means for causing the computer to generate an instruction decode unit configured to decode an instruction during said first phase; and computer readable program means for causing the computer to generate a bypass control unit configured to derive bypass control information about said instruction during said first phase.

20. A method of accessing a register file in a microprocessor, the method comprising:

providing a register file;

providing a register within said register file adapted to store information;

providing a clock signal defining a first phase and a second phase;

predicting during said first phase that said register should be accessed while withholding at least some output from said register;

dispatching an instruction that specifies a register;

confirming said instruction was dispatched during said first phase;

deriving bypass control information about said instruction during said first phase;

determining that the information stored in said register has not been bypassed; and enabling at least one register bitline of said register during said second phase in response to said confirming said instruction was dispatched during said first phase and in response to said determining that the information stored in said register has not been bypassed.

21. A computer product, comprising:

a computer-readable medium that stores:

computer code that describes a register adapted to store information;

computer code that describes clock circuitry, said clock circuitry operable to provide a clock signal defining a first phase and a second phase;

computer code that describes an instruction decode unit configured to decode an instruction that specifies said register;

computer code that describes a logic unit adapted to enable at least one register bitline of said register during said second phase of said clock signal so as to allow said instruction to utilize said information stored in said register.

22. The computer product as described in claim 21 and further comprising:

computer code that describes means for confirming that said instruction was dispatched during said first phase.

23. The computer product as described in claim 21 and further comprising:

computer code that describes means for determining that the information stored in said register has not been bypassed.

* * * * *